(12) United States Patent
Clouser

(10) Patent No.: US 8,692,514 B2
(45) Date of Patent: Apr. 8, 2014

(54) CHARGING STATION FOR PORTABLE ELECTRONIC DEVICES

(76) Inventor: Doug Clouser, Marysville, OH (US)

(*) Notice: Subject to any disclaimer, the term of this patent is extended or adjusted under 35 U.S.C. 154(b) by 355 days.

(21) Appl. No.: 13/189,180

(22) Filed: Jul. 22, 2011

(65) Prior Publication Data

US 2012/0019208 A1 Jan. 26, 2012

Related U.S. Application Data

(60) Provisional application No. 61/367,074, filed on Jul. 23, 2010.

(51) Int. Cl.
*H02J 7/00* (2006.01)

(52) U.S. Cl.
CPC .............. *H02J 7/0044* (2013.01); *H02J 7/0045* (2013.01); *H02J 7/0042* (2013.01); *H01M 7/1022* (2013.01); *H01M 2220/30* (2013.01)
USPC .............................. 320/115; 320/113; 320/107

(58) Field of Classification Search
CPC ............................... H02J 7/0044; H02J 7/0045
USPC .................................................. 320/115, 113
See application file for complete search history.

(56) References Cited

U.S. PATENT DOCUMENTS

| | | | |
|---|---|---|---|
| 5,635,814 A | * | 6/1997 | Afzal et al. ................... 320/111 |
| 2005/0093510 A1 | * | 5/2005 | Seil et al. ...................... 320/114 |
| 2011/0172839 A1 | * | 7/2011 | Brown et al. ................. 700/292 |

FOREIGN PATENT DOCUMENTS

CN 201219124 Y * 4/2009

* cited by examiner

*Primary Examiner* — M'Baye Diao
(74) *Attorney, Agent, or Firm* — Porter Wright Morris & Arthur, LLP

(57) ABSTRACT

A charging station for portable electronic devices includes a base having a substantially vertical and forward facing wall and a plurality of suction cups secured to the wall to temporarily secure the portable electronic devices to the wall in a position that the portable electronic devices can be viewed and operated while recharging. The suction cups can be secured in a plurality of laterally spaced-apart positions so that multiple portable electronic devices can be secured side-by-side for recharging or more than one suction cup can secure a larger portable electronic device. The suction cups can also be secured in a plurality of vertically spaced apart positions so that the suction cup can engage the portable electronic device at a selected height or so that more than one suction cup can secure the portable electronic device. The charging station also organizes mail, keys, wallets, and the like.

20 Claims, 15 Drawing Sheets

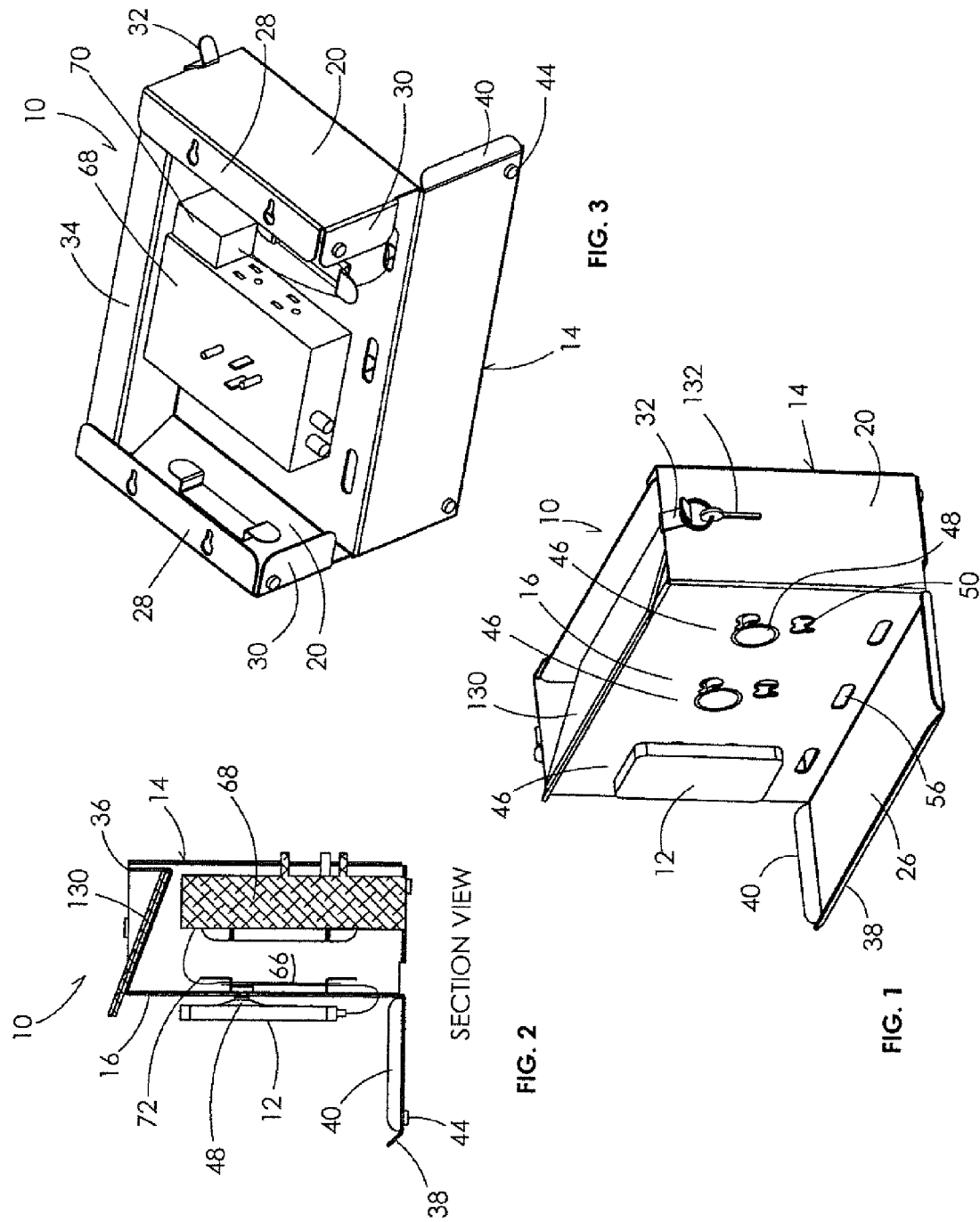

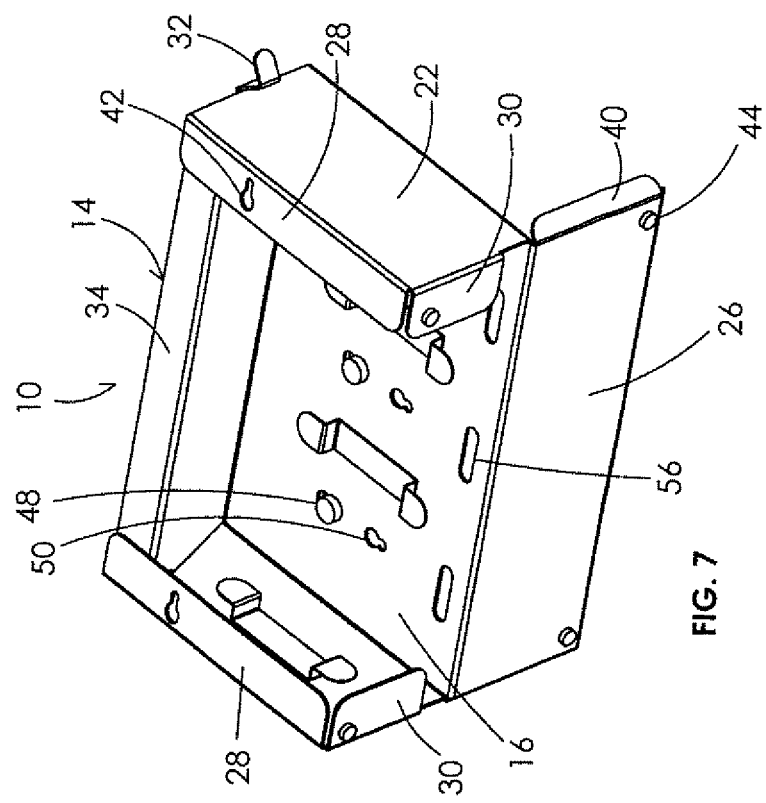
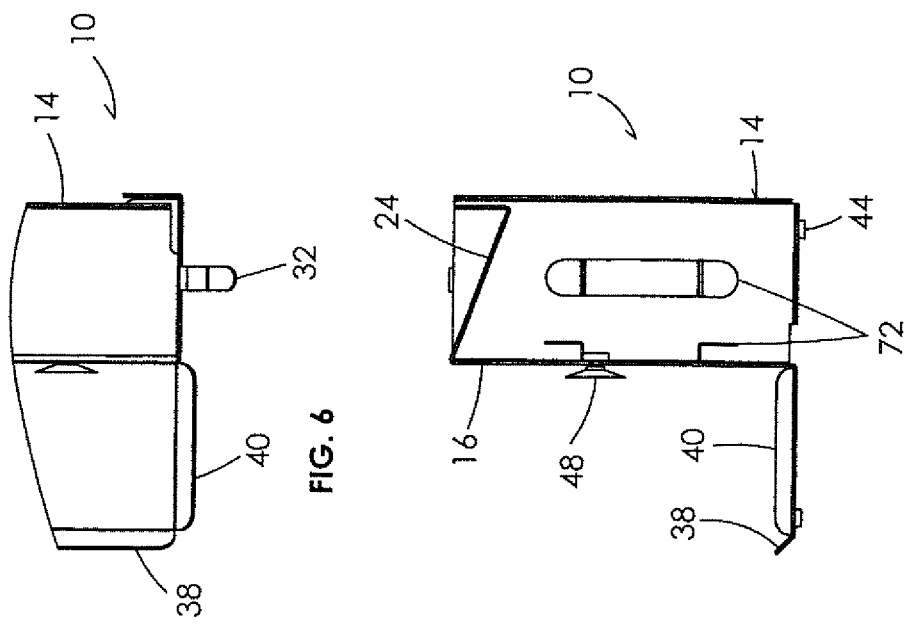
FIG. 7
FIG. 6
FIG. 5

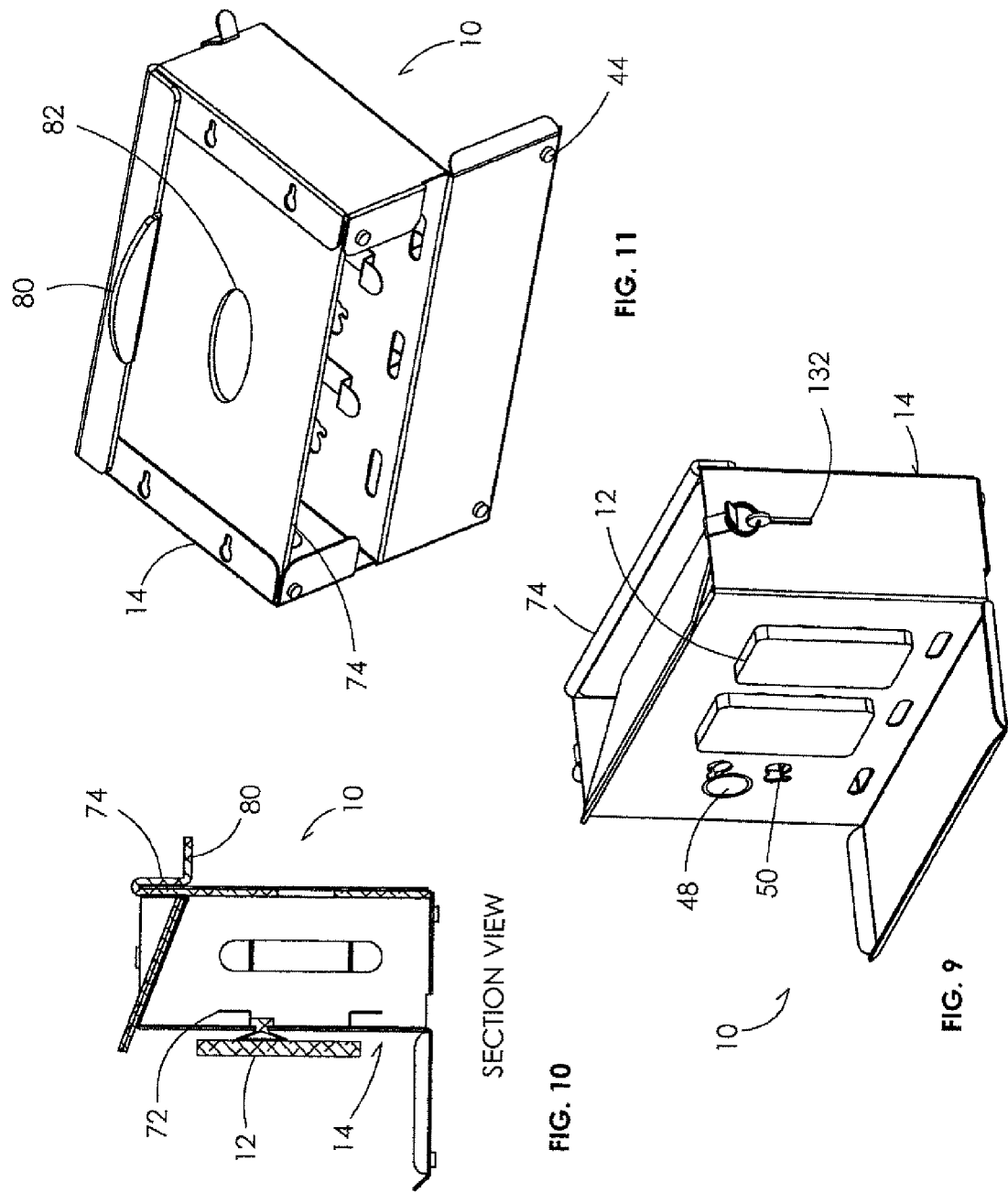

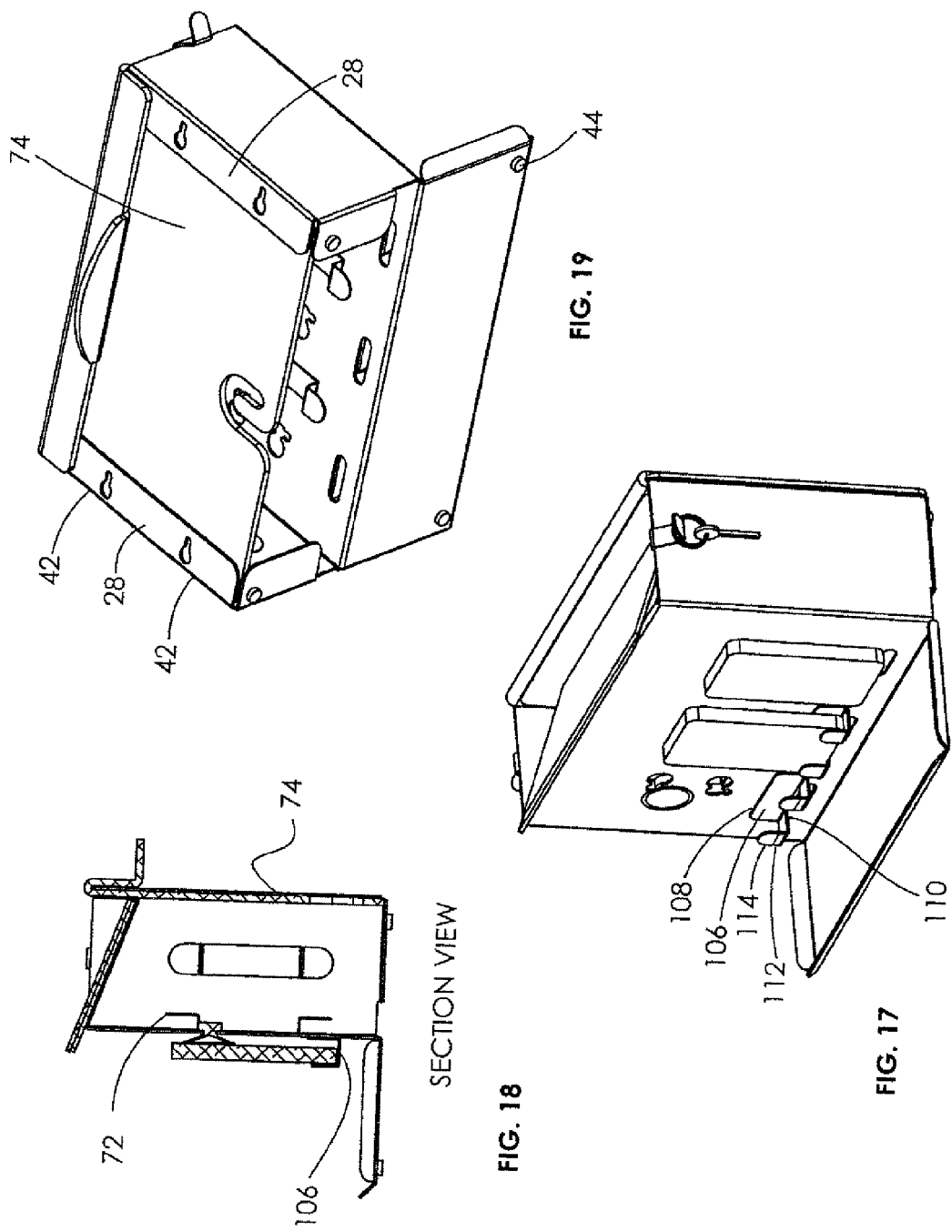

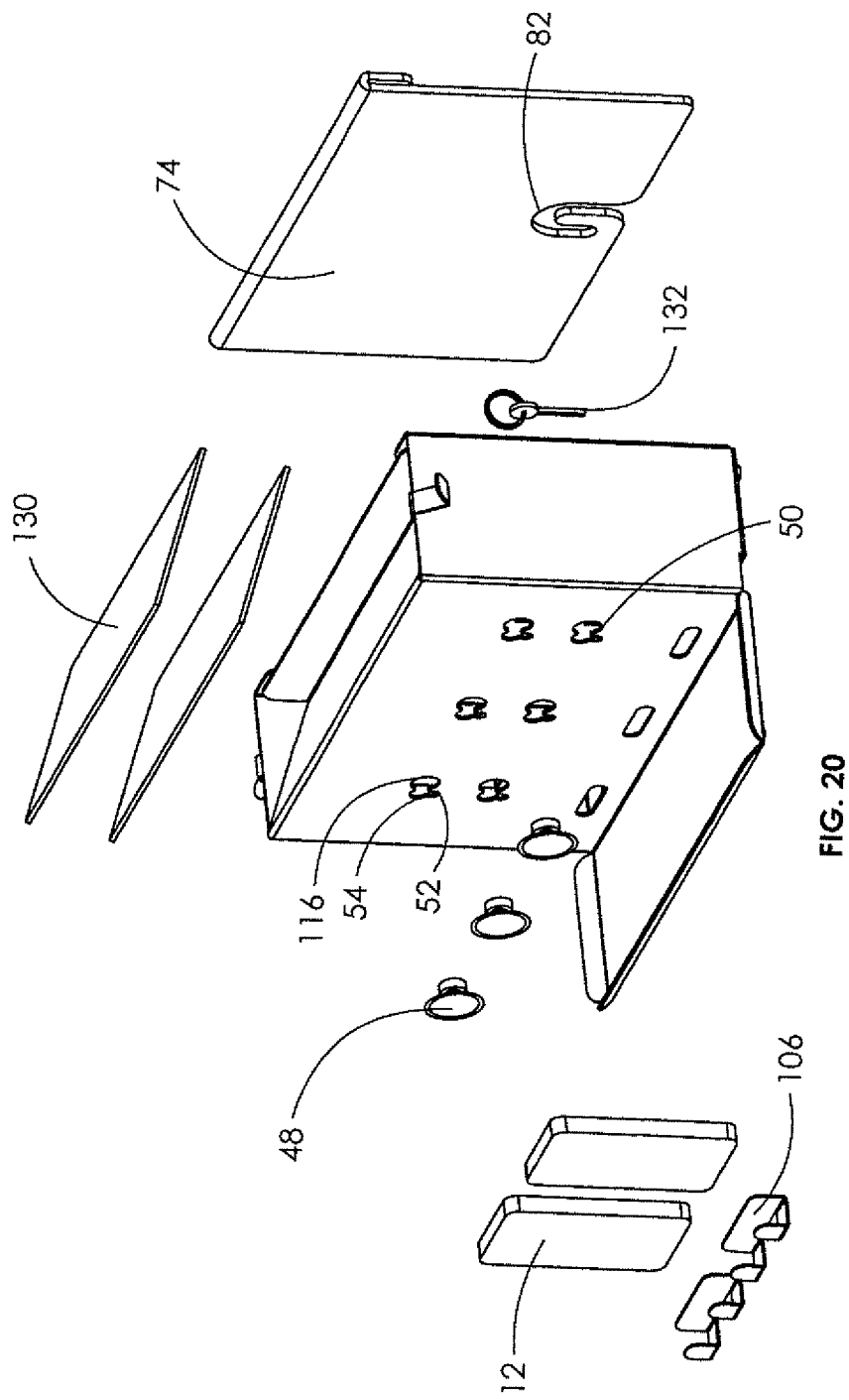

FIG. 24
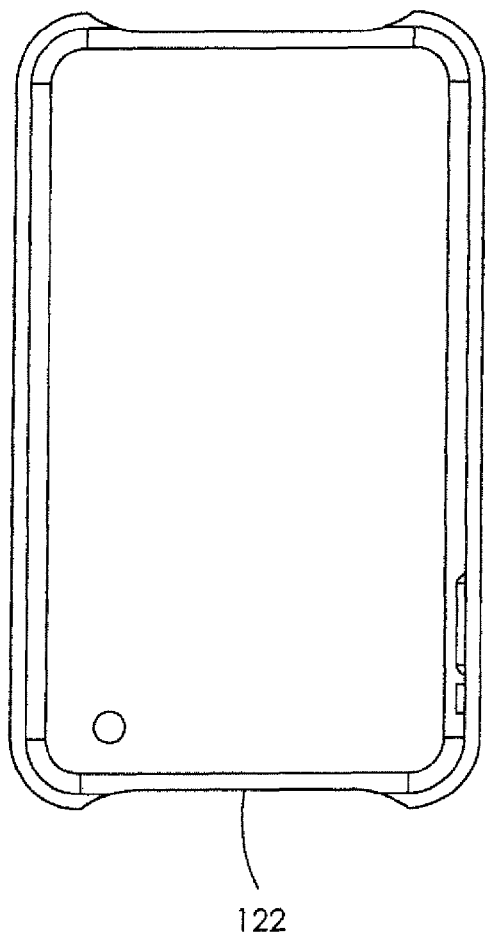
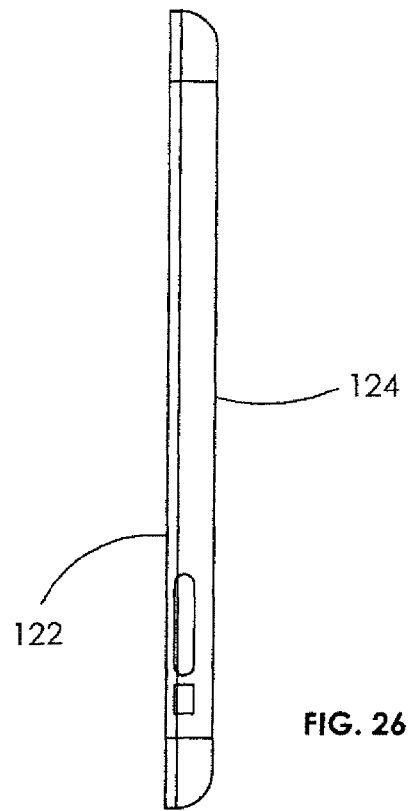
FIG. 26
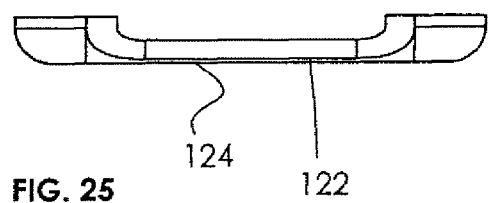
FIG. 25

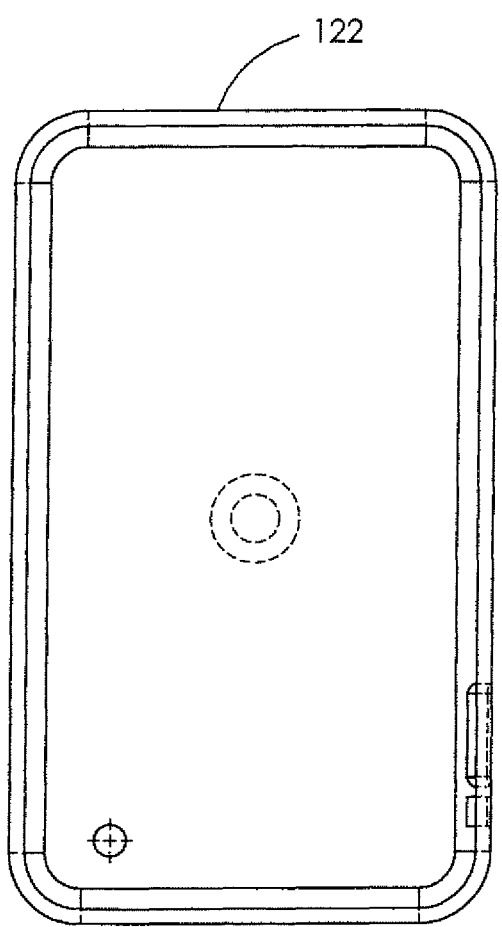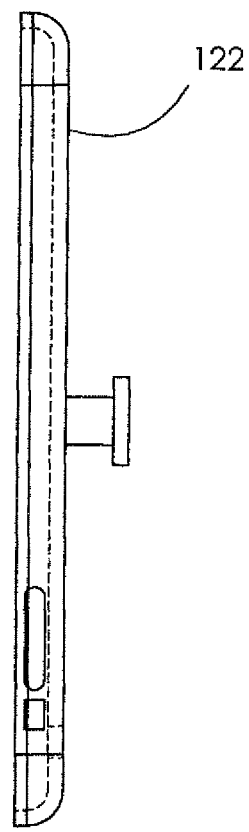
FIG. 29  FIG. 30 ently, there is a need for an improved charging station that improves visibility and usability of the personal electronic devices during charging and/or organizes and holds other objects that do not need to be charged such as mail, keys, wallets and the like.

CHARGING STATION FOR PORTABLE ELECTRONIC DEVICES

CROSS-REFERENCE TO RELATED APPLICATIONS

This application claims priority from U.S. Provisional Patent Application No. 61/367,074 filed on Jul. 23, 2010, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to charging stations for portable electronic devices and, more particularly, to such charging stations which permit viewing and operation of the portable electronic device during recharging.

BACKGROUND OF THE INVENTION

Portable electronic devices such as, telephones, personal digital assistants (PDAs), digital cameras, mp3 players, tablet computers, and the like, typically utilize rechargeable batteries as a power source. The batteries are typically recharged by plugging an AC to DC power converter into the portable electronic device and into an AC power wall receptacle or outlet. The AC to DC power converter converts 110 or 120 volt AC power from the wall outlet to low voltage DC power used to charge the batteries.

With the increase in the number of available portable electronic devices, consumers can find themselves with an unpleasant and unsightly tangle of wires, cords, and/or cables for the devices. This is because each of the devices can require a different type of AC to DC converter. In addition to the unsightly appearance, the tangled wires can be unsafe because kinked wires are more susceptible to failure and because it is difficult to identify a particular cable when it is intertwined with other cables.

This problem has led to the introduction of battery charging stations that provide a mechanism for recharging the batteries of multiple personal electronic devices. Such stations can be convenient and useful for eliminating the tangle of wires. However, such stations are inadequate in that they make it difficult to view and/or use the personal electronic devices while recharging and/or are not multifunctional. Accordingly, there is a need for an improved charging station that improves visibility and usability of the personal electronic devices during charging and/or organizes and holds other objects that do not need to be charged such as mail, keys, wallets and the like.

SUMMARY OF THE INVENTION

Disclosed are charging stations which address one or more issues of the related art. Disclosed is a charging station for a portable electronic device comprising, in combination, a base having a substantially vertical and forward facing wall, and at least one forward facing fastener on the forward facing wall so that the fastener can temporarily secure the portable electronic device to the forward facing wall to limit movement of the personal electronic device in at least one lateral direction and in a position that the portable electronic device can be viewed and operated while recharging.

Also disclosed is a charging station for a portable electronic device comprising, in combination, a base having a substantially vertical and forward facing wall, and at least one forward facing suction cup secured to the forward facing wall so that the suction cup can temporarily secure the portable electronic device to the forward facing wall in a position that the portable electronic device can be viewed and operated while recharging.

Also disclosed is a charging station for portable electronic devices comprising, in combination, a base having a substantially vertical and forward facing wall, and a plurality of forward facing suction cups secured to the forward facing wall so that the suction cups can temporarily secure the portable electronic devices to the forward facing wall to limit movement of the personal electronic device in at least one lateral direction and in a position that the portable electronic device can be viewed and operated while recharging. Openings are formed in the forward facing wall for removably securing the suction cups. Each of the openings has a first portion sized for preventing passage of a first flange of a first one of the suction cups therethrough for retaining the first one of the suction cups to the forward facing wall, a second portion sized larger than the first portion for passage of the first flange of the first one of the suction cups therethrough for installation and removal of the first one of suction cups to the forward facing wall and sized for preventing passage of a second flange of a second one of the suction cups therethrough for retaining the second one of the suction cups to the forward facing wall, and third portion sized larger than the second portion for passage of the second flange of the second one of the suction cups therethrough for installation and removal of the second one of suction cups to the forward facing wall.

From the foregoing disclosure and the following more detailed description of various preferred embodiments it will be apparent to those skilled in the art that the present invention provides a significant advance in the technology and art of charging stations. Particularly significant in this regard is the potential the invention affords for providing a relatively low cost, versatile, and easy to use charging station which improves usability of the personal electronic devices during charging and organizes and also holds other objects that do not need to be charged. Additional features and advantages of various preferred embodiments will be better understood in view of the detailed description provided below.

BRIEF DESCRIPTION OF THE DRAWINGS

These and further features of the present invention will be apparent with reference to the following description and drawings.

FIG. 1 is a front perspective view of a charging station for portable electronic devices according to a first embodiment of the present invention.

FIG. 2 is a section view of the charging station of FIG. 1.

FIG. 3 is a rear perspective view of the charging station of FIGS. 1 and 2.

FIG. 5 is a sectional view similar to FIG. 2 but with an outlet adapter removed for clarity.

FIG. 6 is a fragmented top plan view showing the left end of the charging station of FIGS. 1 to 5.

FIG. 7 is rear perspective view similar to FIG. 3 but with the outlet adapter removed for clarity.

FIG. 9 is a front perspective view similar to FIG. 1 but with a rear cover added for use in a desktop application.

FIG. 10 is a section view similar FIG. 2 but with the rear cover of FIG. 9.

FIG. 11 is a rear perspective view similar FIG. 3 but with the rear cover of FIGS. 9 and 10.

FIG. 17 is a front perspective view similar to FIG. 9 but with bottom supports for the portable electronic devices.

FIG. 18 is a section view similar FIG. 10 but with the bottom supports of FIG. 17.

FIG. 19 is a rear perspective view similar FIG. 11 but with additional mounting openings.

FIG. 20 is a partially exploded front perspective view similar FIG. 12 but with the bottom supports of FIGS. 17 and 18.

FIG. 24 is a front elevational view of a plastic sleeve for a portable electronic device which provides a planar attachment surface for use with the charging stations of FIGS. 1 to 23.

FIG. 25 is a bottom plan view of the sleeve of FIG. 24.

FIG. 26 is a left side elevational view of the sleeve of FIGS. 24 and 25.

FIG. 29 is a rear elevational view of a sleeve for a portable electronic device which has an alternative fastener in the form of a flanged pin or peg for use with the charging stations of FIGS. 1 to 23.

FIG. 30 is a right side elevational view of the sleeve of FIG. 29.

Figure 8:
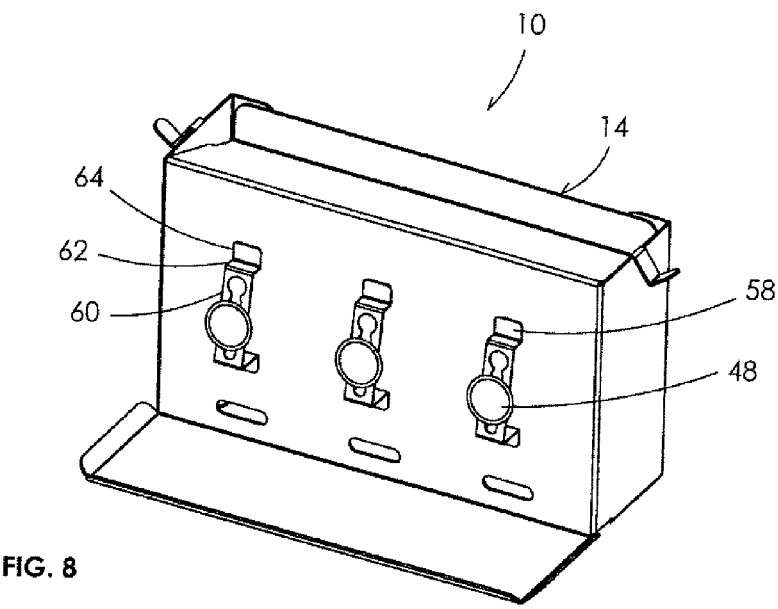
FIG. 8 is a perspective view a variation of the charging station of FIGS. 1 to 7.
Figure 4:
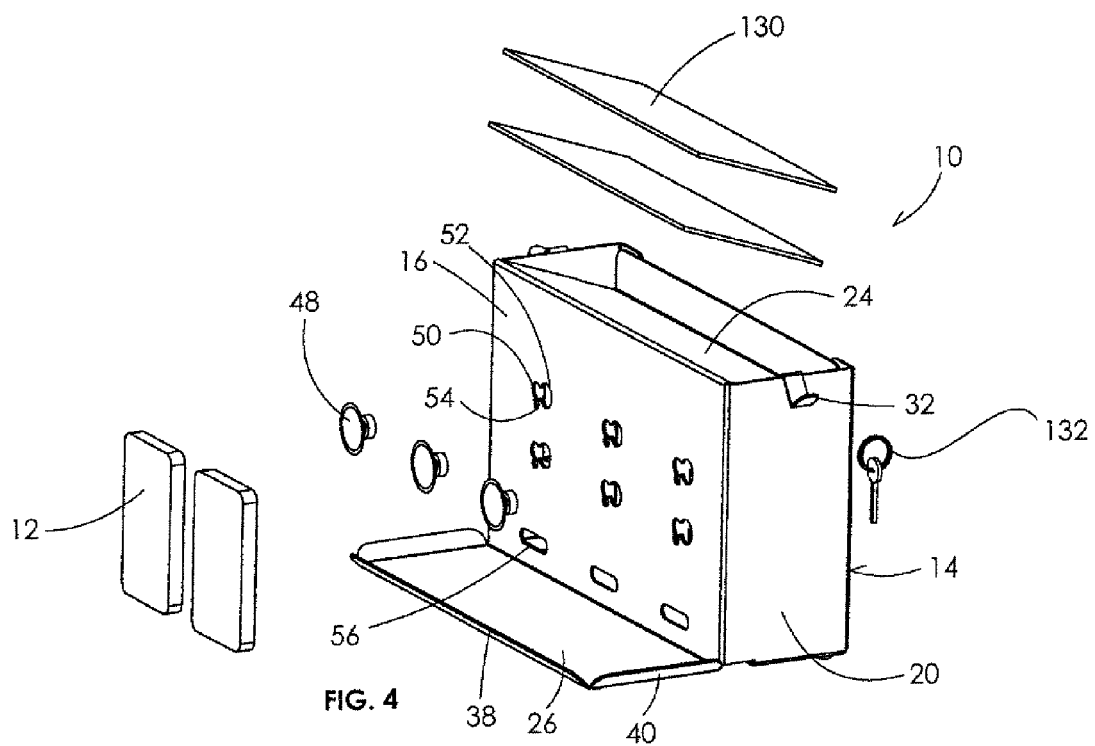
FIG. 4 is a partially exploded front perspective view of the charging station of FIGS. 1 to 3.
Figure 12:
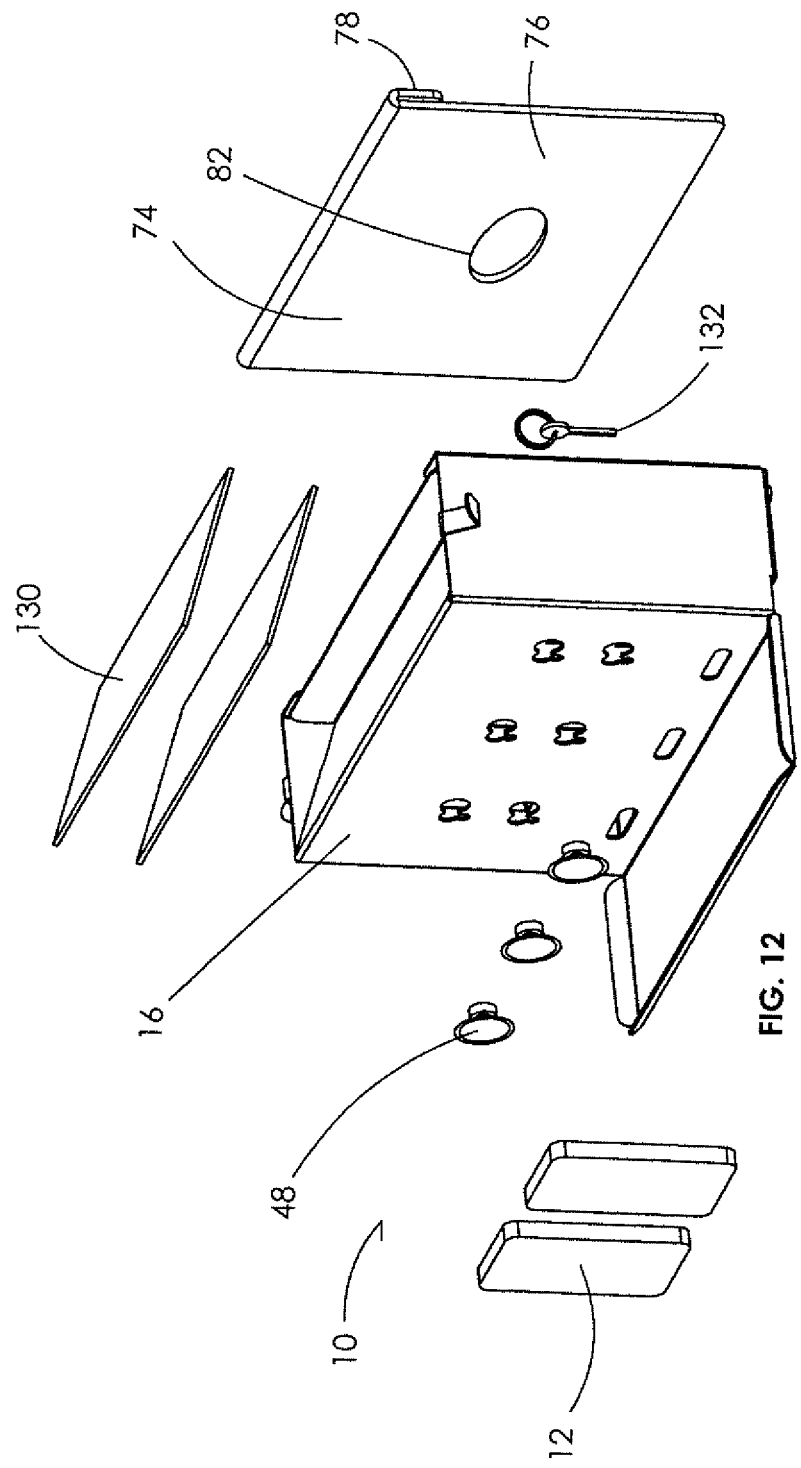
FIG. 12 is a partially exploded front perspective view similar FIG. 4 but with the rear cover of FIGS. 9 to 11.

It should be understood that the appended drawings are not necessarily to scale, presenting a somewhat simplified representation of various preferred features illustrative of the basic principles of the invention. The specific design features of the charging stations as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the charging stations illustrated in the drawings. In general, up or upward generally refers to an upward direction within the plane of the paper in FIG. 2 and down or downward generally refers to a downward direction within the plane of the paper in FIG. 2. Also in general, front or forward generally refers to a leftward direction within the plane of the paper in FIG. 2 and rear or rearward generally refers to a rightward direction within the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the charging stations disclosed herein. The following detailed discussion of various alternative and preferred embodiments will illustrate the general principles of the invention. Other embodiments suitable for other applications will be apparent to those skilled in the art given the benefit of this disclosure.

Referring now to the drawings, FIGS. 1 to 7 show a charging station 10 for a portable electronic device 12 according to a first embodiment of the present invention. The illustrated charging station 10 includes a body or base 14 having a substantially vertical and forward-facing front wall 16 and a plurality of forward facing fasteners 18 on the wall 16 so that the fasteners 18 can temporarily secure the portable electronic devices 12 to the wall 16 to limit movement of the personal electronic devices 12 in at least one lateral direction (and preferably both lateral directions) and in a position that the portable electronic device can be viewed and operated while recharging. The fastener 18 is temporarily secured to the back of the portable electronic device 12 so that the portable electronic device 12 is held in a substantially vertical and forward facing orientation so that it can be easily viewed and used while recharging and can be easily removed from the fastener 18 when recharging is complete. The fastener 18 limits movement of the portable electronic device 18 in at least one lateral direction so that the portable electronic device 18 can be operated with one hand, that is, it is not necessary to hold or stabilize the portable electronic device 12 with one hand while operating it with the other hand. The term "portable electronic device" is used in the specification and claims to mean a handheld electronic device that utilizes rechargeable batteries as a power source including, but not limited to, telephones, personal digital assistants (PDAs), digital cameras, mp3 players, video game players, messaging systems, video players, portable televisions such as LCD televisions, tablet computers, and the like.

The illustrated base 14 includes the vertically-extending and forward facing front wall 16, vertically extending and laterally facing left and right side walls 20, 22 that rearwardly extend from opposed lateral edges of the front wall 16, an inclined top wall 24 rearwardly extending from a top edge of the front wall 16, and a horizontally-extending and upward facing base wall 26 that forwardly extends from a bottom edge of the front wall 16. The illustrated front wall 16 is vertically extending but it is noted that the front wall can alternatively be slightly angled or substantially vertical. The term "substantially vertical" is used in this specification and claims to mean that the front wall 16 is no more than 45 degrees from vertical so that the portable electronic device 12 secured thereto is substantially vertical and can be easily used and viewed while recharging. The illustrated side walls 20, 22 each include a vertically extending and rearward facing back flange 28 that perpendicularly extends from a rear edge of the side wall 20, 22 and a horizontally extending and downward facing bottom flange 30 that perpendicularly extends from a bottom edge of the side wall 20, 22. The illustrated side walls 20, 22 are also each provided with hooks 32 laterally extending from the top edge of the side walls 20, 22. The hooks 32 are preferably sized and shaped for temporarily supporting key rings. The illustrated top wall 24 extends the entire length between the side walls 20, 22 and downwardly inclines in a rearward direction. The illustrated top wall 24 is provided with a vertically extending and rearward facing back flange 34 that extends from a rear edge of the top wall 24. The top wall 24 is sized and shaped to support items such as, for example, the illustrated envelopes or other mail, portable electronic devices and their accessories, other personal items, and the like.

As best shown in FIGS. 5 and 6, the back flange 34 of the top wall 24 is forwardly spaced from the back flanges 28 of the side walls 20, 22 to form a space or gap 36 therebetween. The gap 36 is preferably sized for extending power cords or cables through the gap to personal electronic devices located on the top wall 24. The illustrated base wall 26 is provided with front and side flanges 38, 40 that upwardly incline from front and side edges of the base wall 26 respectively. The base wall flanges 38, 40 are sized and shaped to assist retaining any items lying on the base wall 26 such as, for example, portable electronic devices 12 and their accessories, and the like.

A pair of key-shaped openings 42 is provided on the back flanges 28 of the side walls 20, 22 for securing the base 14 to a wall or other vertically extending support surface. The illustrated key shaped openings 42 are sized for cooperating with #8 size screws but any other suitable size and shape can alternatively be utilized. The illustrated key-shaped openings 42 are oriented in the same lateral direction so that horizontal movement of the base 14 is required for mounting and removal of the base 14 to the wall. It is noted that any other suitable location and/or shape of mounting openings 42 can alternatively be utilized. A plurality of feet 44 is provided on the bottom of the base wall 26 and the side wall bottom flanges 30. The feet 44 are sized, shaped and positioned so that the base 14 can rest in a stable position on top of a horizontal support surface such as a desktop, kitchen countertop, night stand, or the like. It is noted that any other suitable location, quantity, and/or shape of feet 44 can alternatively be utilized. Additionally, double sided suction caps can be provided on the bottom of the base 14 to provide a positive connection between the base 14 the supporting surface. This can be particularly helpful when the supporting surface is smooth and slick such as, for example, granite, to prevent the charging station 10 from sliding when operating the portable electronic device 12. Configured in this manner, the base 14 can be alternatively mounted to a wall or supported on a table top as desired by user.

The illustrated front wall 16 is provide with three laterally spaced-apart attachment locations 46 for the portable electronic devices 12. It is noted that a greater or lesser quantity of attachment locations 46 can alternatively be utilized. The illustrated fasteners 18 at the attachment locations 46 are suction cups 48 which can be easily secured to the portable electronic devices 12 with suction or vacuum and easily removed from the portable electronic devices 12 when the suction or vacuum connection is broken. As best shown in FIGS. 2 and 5, illustrated the suction cups 48 each have a cup portion for directly engaging the rear side of the portable electronic device 12, a flange portion for securing the suction cup 48 to the front wall 16, and a throat portion connecting the cup portion to the flange portion that is smaller than both the cup portion and the flange portion. It is noted that any other suitable type of suction cup 48 can alternatively be provided Each illustrated attachment location 46 includes a pair of vertically spaced apart key-shaped openings 50 and a forward-facing suction cup 48 removably secured to one of the openings 50. Each opening 50 has a first or smaller portion 52 sized for preventing passage of the flange of the suction cup 48 therethrough for retaining the suction cup 48 to the front wall 16 and a second or larger portion 54 sized larger than the first portion 52 for passage of the flange therethrough for installation and removal of the suction cup 48 to the front wall 16. To secure the suction cup 48 to the front wall 16, the flange is inserted through the larger portion 54 of the opening 50 and then the throat portion is moved into the smaller portion 52 of the opening 50 so that the flange cannot be withdrawn. The process is reversed to remove the suction cup 48 from the front wall 16. It is noted that the direction for removing the suction cup 48 is different than the direction for removing the fasteners securing the base 14 to the wall. The suction cup 48 can be selectively moved between the two upper and lower openings 50 of the attachment location 46 depending on the desired position for the portable electronic device 12 or the best location to engage the portable electronic device 12. It is noted that a greater or lesser quantity of the openings 50 and/or the suction cups 48 can alternatively be provided at each attachment location 46. For example, both of the openings 50 can be provided with suction cups 48 to provide greater stability for the portable electronic device 12 and/or there can be three of the openings 50 at each or some of the attachment locations.

Each illustrated attachment location 16 is also provided with an opening 56 below the key-shaped openings 50 for passage of cables and/or cords therethrough from the base interior to the personal electronic device 12 located at the attachment location or laying on the base wall 26. The illustrated openings 56 are horizontally elongated slots but any other suitable size, shape, and/or quantity can alternatively be utilized.

As shown in FIG. 8, spacers 58 can be provided to position the suction cups 48 further forward of the front wall 16 so that there is a larger gap behind the portable electronic device 12 in order to aid in removing the suction cup 48 from the portable electronic device 12. The illustrated spacers 58 have a vertically extending main portion 60 in which a the vertically spaced-apart openings 50 are provided in, horizontally extending spacing portions 62 rearwardly extending from the upper and lower ends of the main portion 60, and vertically extending attachment portions 64 upwardly and downwardly extending from the upper and lower spacing portions 62 respectively. The attachment portions 64 engage and are secured to the front wall 16 in any suitable manner such as, for example, double sided tape and the like. It is noted that the spacers 58 can alternatively have any other suitable shape and size.

The walls 16, 20, 22 of the illustrated base 14 form an interior space 66 for housing a power adapter 68 and AC/DC converters 70 for the portable electric devices 12. The illustrated power adapter 68 includes a grounded plug located at a rear side of the adapter and six grounded receptacles outlets located on lateral sides of the adapter 68. It is noted that any other suitable power adapter 68 can alternatively be utilized. It is also noted that the illustrated power adapter 68 is not secured to the base 14. To recharge/power the portable electronic devices 12, the power adapter 68 is inserted to a wall power outlet or receptacle and the AC/DC converters 70 are inserted into both the power receptacles of the power adapter 68 and the appropriate connectors on the portable electronic devices 12. For portable electronic devices 12 located at the attachment locations 46 or laying on the base wall 26, the cords or cables of the AC/DC converters 70 extend through the openings 56 in the front wall 16. For portable electronic devices 12 lying on the top wall 24, the cords or cables of the AC/DC converters 68 extend through the gap 36 between the top wall 24 and the rear flanges 28 of the side walls 20, 22. The illustrated base 14 is provided with a plurality of cord wraps 72 within the interior space 66 so that excess lengths of the cords or cables can be wound about the cord wraps 72. The illustrated base 14 has four cord wraps 72 that are secured to the interior sides of the side walls 20, 22 and the front wall 16 between the attachment locations 46. The cord wraps 72 can be secured to the walls 16, 20, 22 in any suitable manner. It is noted that any other quantity, type, and/or locations of the cord wraps 72 can alternatively be utilized.

The illustrated base 14 is formed from a suitable sheet metal such as, for example, a steel sheet metal. It is noted, however, that the base 14 can alternatively be manufactured from a different process such as, for example, injection molding and the like and/or a different material such as, for example plastic, wood, and the like.

The illustrated charging station 10 is mounted to a wall over a wall electrical power outlet. Preferably inserts are positioned in the wall above and on opposed sides of the wall outlet. Protruding screws are positioned in the inserts. With the adapter 68 plugged into the wall outlet, the AC/DC converters 70 positioned within the charging station 10 are plugged into the adapter 68 and the base 14 is secured to the wall over the wall outlet and the adapter 68. The base 14 is secured to the wall by inserting the heads of the screws through the large portion of the openings 42 in the back flanges 28 and then moving the base 14 laterally to move the screws into the small portion if the openings 42 so that the screws cannot be withdrawn. With the base 14 secured to the wall in this manner, portable electronic devices 12 can be removably secured to the suction cups 48 and connected to the AC/DC adapters 70 so that they can be recharged. To remove the portable electronic devices 12, the portable electronic devices 12 can be removed from the suction cups 48 or the suction cups 48 can be removed from the front wall 16 (with an upward motion in the illustrated embodiment) and then removed from the portable electronic device 12. This second method of removal can be helpful when it is difficult to get a finger behind the portable electronic device 12 to the suction cup to break the vacuum. Mounted in this position, the portable electronic devices 12 are positioned so that they can be easily used while recharging. Portable electronic devices 12 can alternatively be laid on the base wall 26 or the top wall 24 if desired. Additionally, mail can be placed on the top wall 24, keys can be placed on the hooks 32, and personal items can be placed on the base wall 26.

The charging station 10 can alternatively be supported on a table top rather than secured to a wall. FIGS. 9 to 12 illustrate a back cover 74 that can be utilized to substantially close the back opening of the base 14 when the charging station 10 is used in a table top configuration. The illustrated cover 74 has a main portion 76 having a thickness sized so that it can slide down through the gap 36 formed between the back flanges 28 of the side walls 20, 22 and the flange 34 of the top wall 24 (best shown in FIG. 10). A flange portion 78 of the illustrated back cover 74 extends downwardly from the top of the main portion 76 and substantially parallel to the main portion 76 to receive the tops of the side wall back flanges 28 therebetween. The illustrated back cover 74 also is provided with a handle portion 80 centrally located on the flange portion 78 for inserting and removing the back cover 74. An opening 82 is provided in the main portion 76 of the back cover 74 to extend cords or cables to a wall electrical power outlet. It is noted that the adapter 68 can be positioned either at the wall outlet or within the base 14. The illustrated opening 82 is oval shaped but any other suitable shape can be utilized. The illustrated back cover 74 is formed of acrylic but it is noted that any other suitable material can be utilized.

Figure 13:
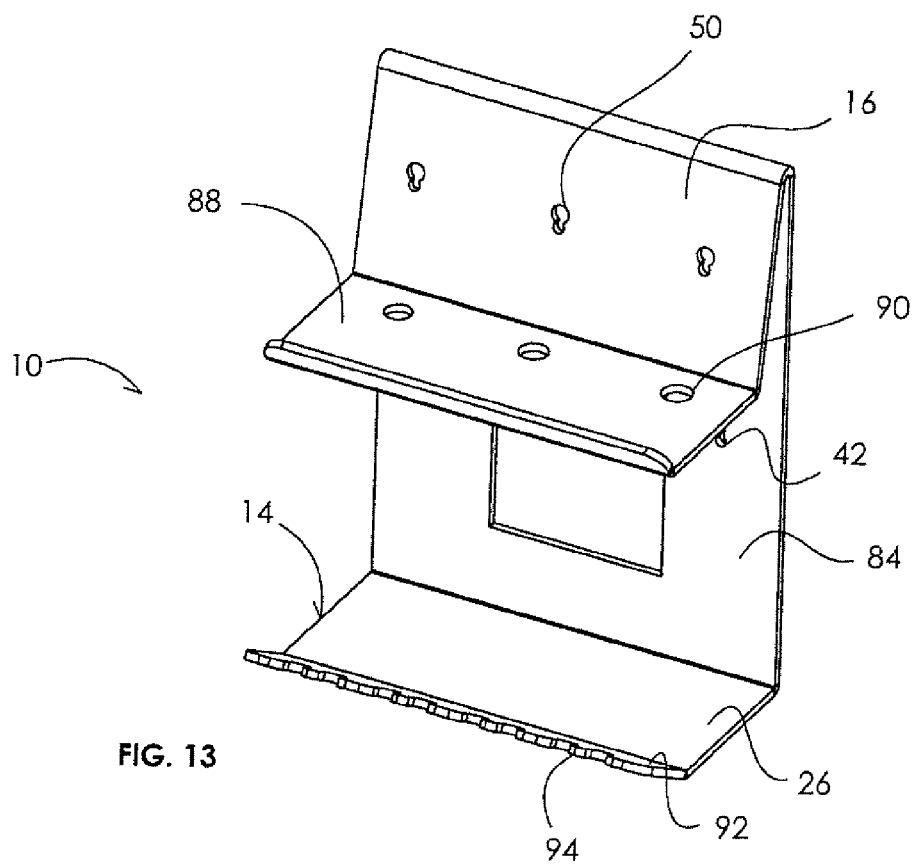
FIG. 13 is a front perspective view of a charging station for portable electronic devices according to a second embodiment of the present invention.

FIG. 13 illustrates a charging station 10 for a portable electronic device 12 according to a second embodiment of the present invention. This embodiment illustrates that the base 14 can take other forms. The illustrated base 14 of this embodiment includes a back wall 84 with an opening 86 for a wall electrical power outlet and key-shaped openings 42 for screws to secure the back wall 84 to a wall. A front wall 16 downwardly extends from the top of the back wall 84 such that it is substantially vertical and is provided with three attachment locations 46 for the portable electronic devices 12. The suction cups 48 are secured the same as described above with regard to the first embodiment of the present invention. A horizontal support wall 88 forwardly extends from the bottom of the front wall 16 and is provided with openings 90 for the passage of cords or cables therethrough. A horizontal base wall 26 forwardly extends from the bottom of the back wall 84 and is provided with a flange 92 forming hooks or mounting points 94 for key rings at its forward end. This embodiment also illustrates that the base 14 can be formed of acrylic.

Figure 14:
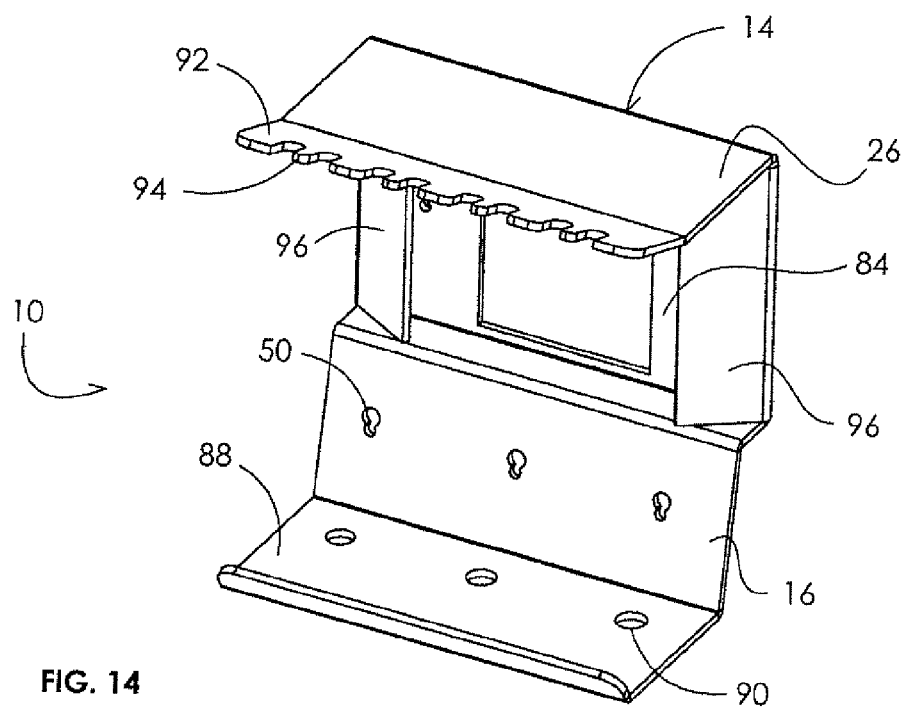
FIG. 14 is a is a front perspective view of a charging station for portable electronic devices according to a third embodiment of the present invention.

FIG. 14 illustrates a charging station 10 for a portable electronic device 12 according to a third embodiment of the present invention. This embodiment further illustrates that the base 14 can take other forms. This base 14 is substantially the same as to the base 14 of the second embodiment described above except that the front wall 16 and the base wall 26 are reversed so that the base wall 26 extends from the top of the back wall 84 and the front wall 16 extends from the bottom of the back wall 84. This embodiment also illustrates that additional walls can be provided to more fully conceal the adapter. The illustrated base 14 has a pair of side walls 96 inwardly angling from sides of the back wall 84.

Figure 15:
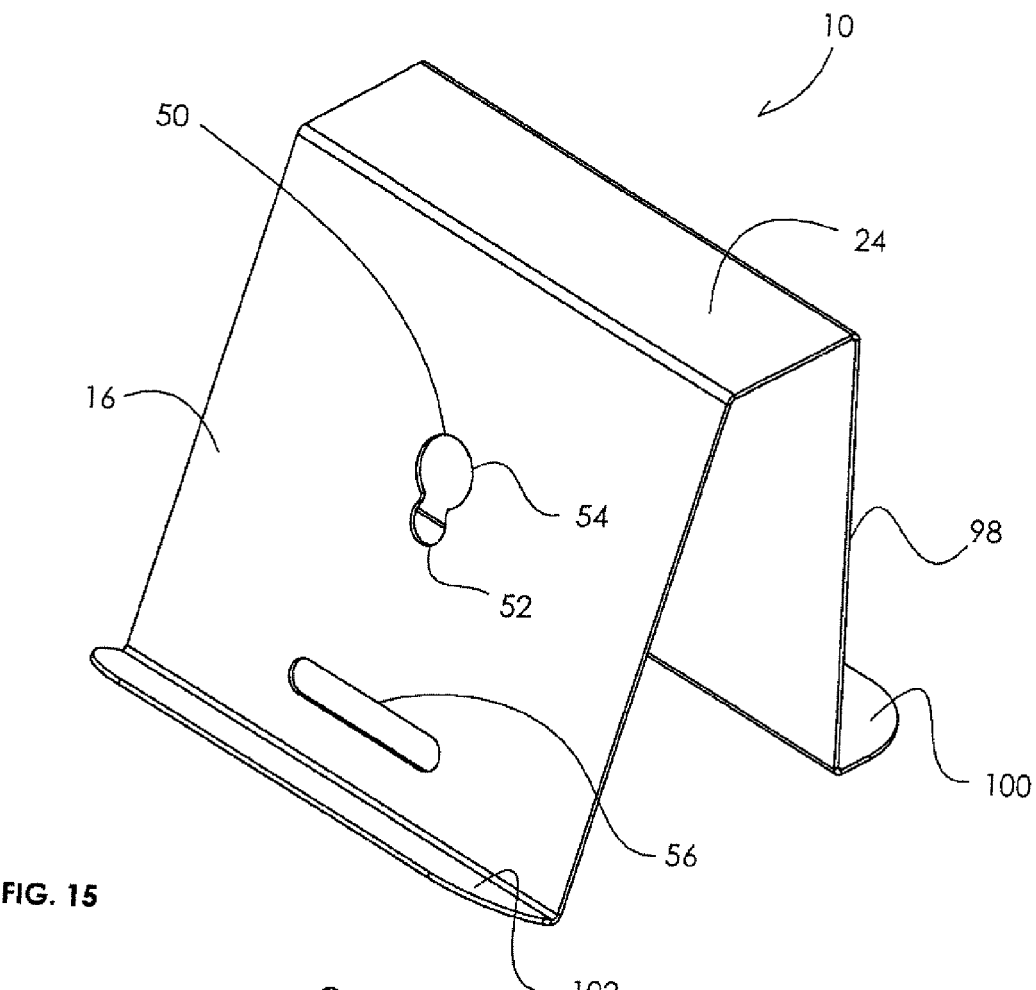
FIG. 15 is a is a front perspective view of a charging station for portable electronic devices according to a fourth embodiment of the present invention.
Figure 16:
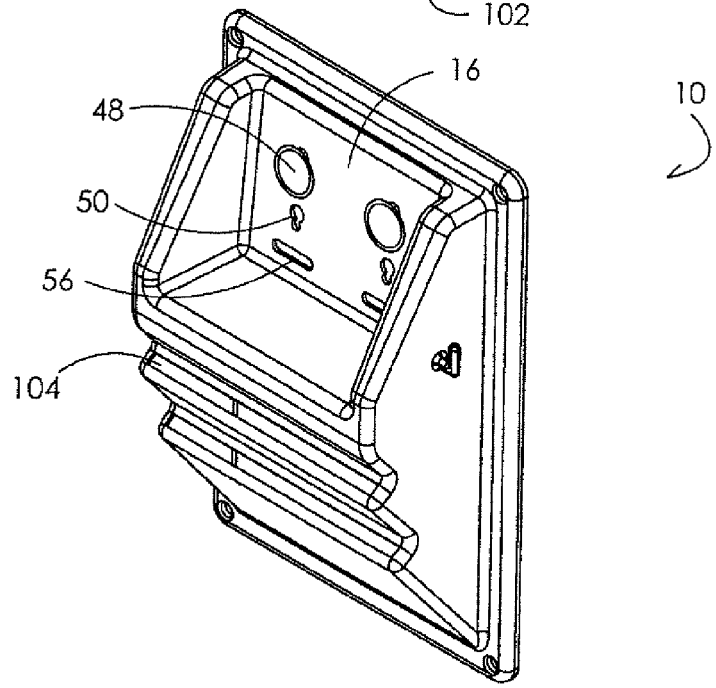
FIG. 16 is a front perspective view of a charging station for portable electronic devices according to a fifth embodiment of the present invention.

FIG. 15 illustrates a charging station 10 for a portable electronic device 12 according to a fourth embodiment of the present invention. This embodiment further illustrates that the base 14 can take other forms. The illustrated base 14 is formed for use on a table top and has a substantially horizontal top wall 24, a substantially vertical back 98 wall downwardly extending from the rear of the top wall 26 and provided with a rearwardly extending horizontal flange 100 at its lower end, and a substantially vertical front wall 16 downwardly extending from the front of the top wall 26 and provided with a forwardly extending horizontal flange 102 at its lower end. The term "substantially vertical" is used to mean that the front wall 16 is no more than 45 degrees from vertical so that the portable electronic device 12 secured thereto can be easily used while recharging. The front wall 16 is provided with a single attachment location 46 for the portable electronic device 12 having a single opening 50 for the suction cup 48. The suction cup 48 is secured the same as described above with regard to the prior embodiments of the present invention. The front wall 16 and is provided with an opening 56 below the suction cup 48 for the passage of a cord or cable therethrough. This embodiment also further illustrates that the base 14 can be formed of acrylic. It is noted that this embodiment of the configuration enables a portable electronic device 12 to be supported on a nightstand and used as an alarm clock FIG. 16 illustrates a charging station 10 for a portable electronic device 12 according to a fifth embodiment of the present invention. This embodiment further illustrates that the base 14 can take other forms and that the base 14 can be molded of a plastic. The illustrated base 14 forms a hollow interior for mounting over a wall electrical power outlet and includes a plurality of slots 104 for storing mail such as, for example, envelopes.

FIGS. 17 to 26 illustrate a variation of the charging station 10 of FIGS. 1 to 12. This variation of the charging station 10 is substantially the same except as described hereinbelow. This charging station 10 is provided with bottom supports or cradles 106 secured to the front wall 16 below the suction cups 48. The bottom supports 106 can limit downward movement of the portable electronic devices 12 if connections with the suction cup 48 inadvertently break or to provide additional support for the portable electronic device 12 when attached to the suction cup 48. The bottom support 106 is particularly desirable in this regard when a user expects to leave a portable electronic device 12 secured to the suction cup 48 for an extended period of time or the user desires a "peace of mind" that the portable electronic device 12 will not accidentally fall. The bottom support 106 can also be useful to establish the suction cup height relative to the bottom of the portable electronic device 12. For example, if a portable electronic device 12 has a specific area which must be secured to the suction cup 48 (because portions of the portable electronic device 12 are unsuitable for an adequate connection with the suction cup 48), the bottom support 106 can be positioned to align the desired area with the suction cup 48 when the portable electronic device 12 is resting on the bottom support 106. Thus, the portable electronic device 12 can be easily secured to the suction cup 48 by first resting the portable electronic device 12 on the bottom support 106 and then rearwardly moving the portable electronic device 12 to engage the suction cup 48 thereto.

The illustrated bottom support 106 has a rear wall 108 for connection to the front wall 16 of the base 14 and a pair of laterally spaced-apart flanges 110 forwardly extending from the bottom edge of the rear wall 108. The flanges 110 have a horizontal bottom portion forwardly extending from the bottom edge of the rear wall 108 and a substantially vertical front portion 112 upwardly extending from a forward edge of the bottom portion 110. The illustrated flanges 110 are sized and shaped so that they limit downward movement of the portable electronic device 12 but do not limit or prevent movement in the upward or lateral directions. Movement in the upward and lateral directions is prevented by the suction cup or cups 48. It is noted that the bottom support 106 can alternatively have any other suitable configuration such as, for example, there can be a single but wider flange 110 and/or the front portions 112 of the flanges 110 can be eliminated. The bottom support 106 can be secured to the base 14 using Command Strips available from the 3M Co., Dual Lock fasteners available from the 3M Co., hook and loop fastener, adhesive, double sided pressure-sensitive adhesive tape, mechanical fasteners, or any other suitable fastening means. The bottom support 106 can be formed of metal, plastic, wood and/or any other suitable material. The illustrated front portions 112 are provided with soft plastic caps 114 to ensure that the bottom support 106 does not scratch or otherwise damage the portable electronic device 12.

As best shown in FIG. 19, the back flanges 28 of the base side walls 20, 22 are provided with an additional pair of key-hole shaped openings 42 for securing the base 14 to the wall. The illustrated base 14 has two pairs of openings 42 but any other suitable quantity of openings 42 can alternatively be utilized. The openings 42 are preferably oriented in the same direction so that additional fasteners can be used to secure the base 14 to the wall to obtain additional rigidity if desired.

As best shown in FIGS. 19 and 20, the opening 82 in the rear cover 74 for the wires or cords is an inverted J-shaped path which opens into the bottom edge of the back cover 74. Shaped in this manner any portion of the cords or wires can be fed into the opening 82 from the edge of the back cover 74 rather than needing to feed an end of the cords or wires through the closed opening 82. It is noted that the opening 82 can alternatively have any other suitable shape which opens into the bottom edge of the back cover 74.

As best shown in FIG. 20, the openings 50 for securing the suction cups 48 to the front wall 16 are double-key shaped. That is, each of the openings 50 has the first portion 52 sized for preventing passage of a flange of a small suction cup 48 therethrough for retaining the suction cup 48 to the front wall 16, a second portion 52 sized larger than the first portion 50 for passage of the flange of small suction cup 48 therethrough for installation and removal of the small suction cup 48 to the front wall 16 and sized for preventing passage of a flange of larger suction cup 48 therethrough for retaining the larger suction cup 48 to the front wall 16, and third portion 116 sized larger than the second portion 54 for passage of flange of the larger suction cup 48 therethrough for installation and removal of the larger suction cup 48 to the front wall 16. The first, second and third portions 52, 54, 116 of the openings 50 are sized so that a small sized suction cup 48 can be inserted into the intermediate portion 54 and slid downward to the small portion 52 to secure the suction cup 48 to the front wall 16 and so that a large sized suction cup 48 can be inserted into the large portion 116 and slid sideways to the intermediate portion 54 to secure the suction cup 48 to the front wall 16. The portions 52, 54, 116 of the illustrated openings 50 are positioned so that the path for the large suction cups 48 is substantially perpendicular to the path for the small suction cups 48. Note that the direction of removal for each of the suction cups 48 is in a different direction than the openings 42 for attachment of the base 14 to the wall.

These double-keyed openings 50 permit the use of a small or a large suction cup 48 in the same opening 50 depending on the requirements of the portable electronic device 12 rather then using more than one suction cup 48. When using a single suction cup 48, the portable electronic device 12 can be rotated to other orientations as desired such as, for example rotating the portable electronic device 12 to a landscape orientation. The portable electronic device 12 can also be easily rotated to pull the portable electronic device 12 out of the suction cup opening 50 if the battery cover of the portable electronic device 12 is removed in the vertical axis. The user can also use two suction cups 48 (any combination of small and large suction cups 48) if redundancy and/or more rigidity is desired.

Figure 21:
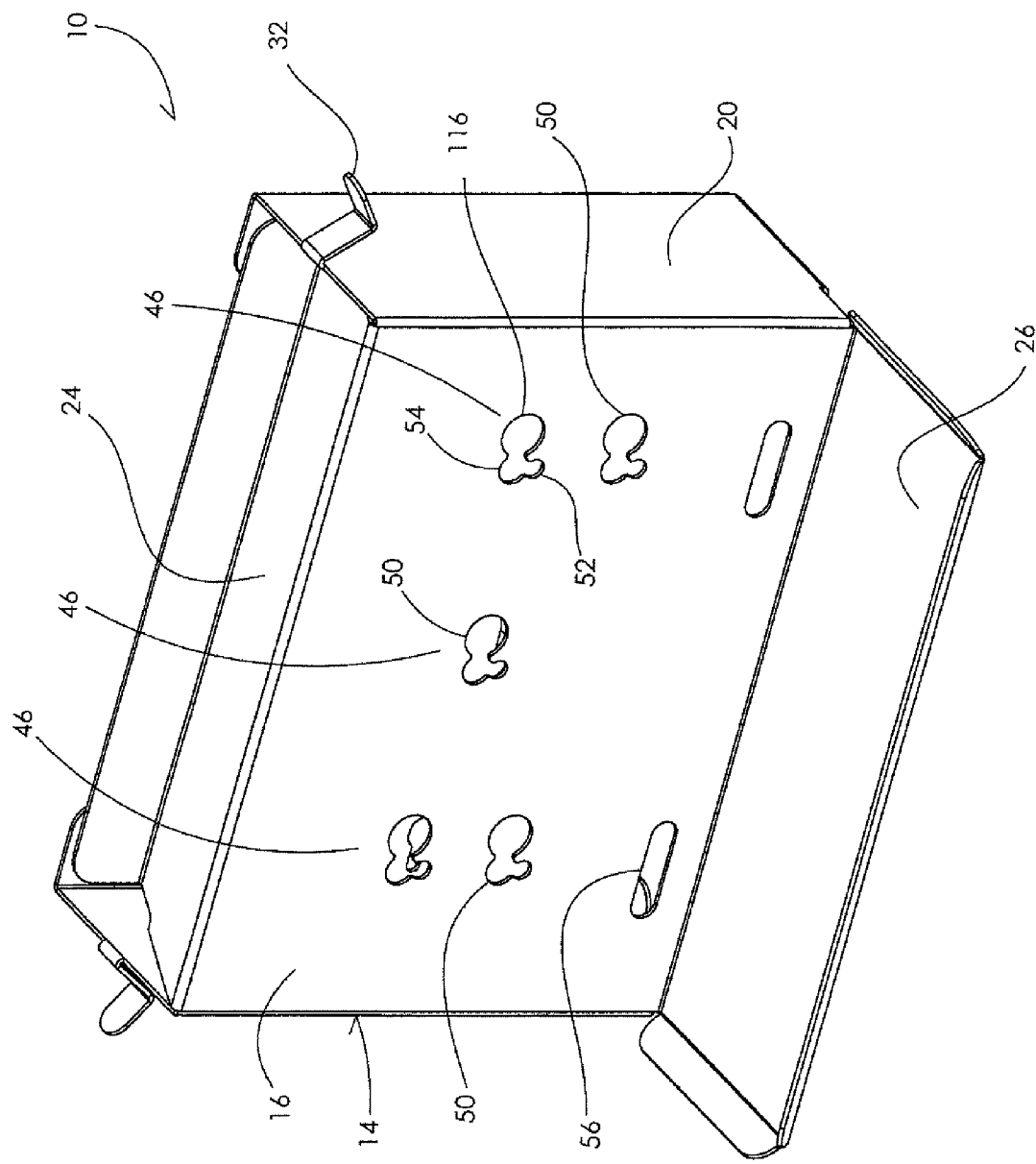
FIG. 21 a front perspective view of a charging station for portable electronic devices according to a sixth embodiment of the present invention, with components removed for clarity.
Figure 22:
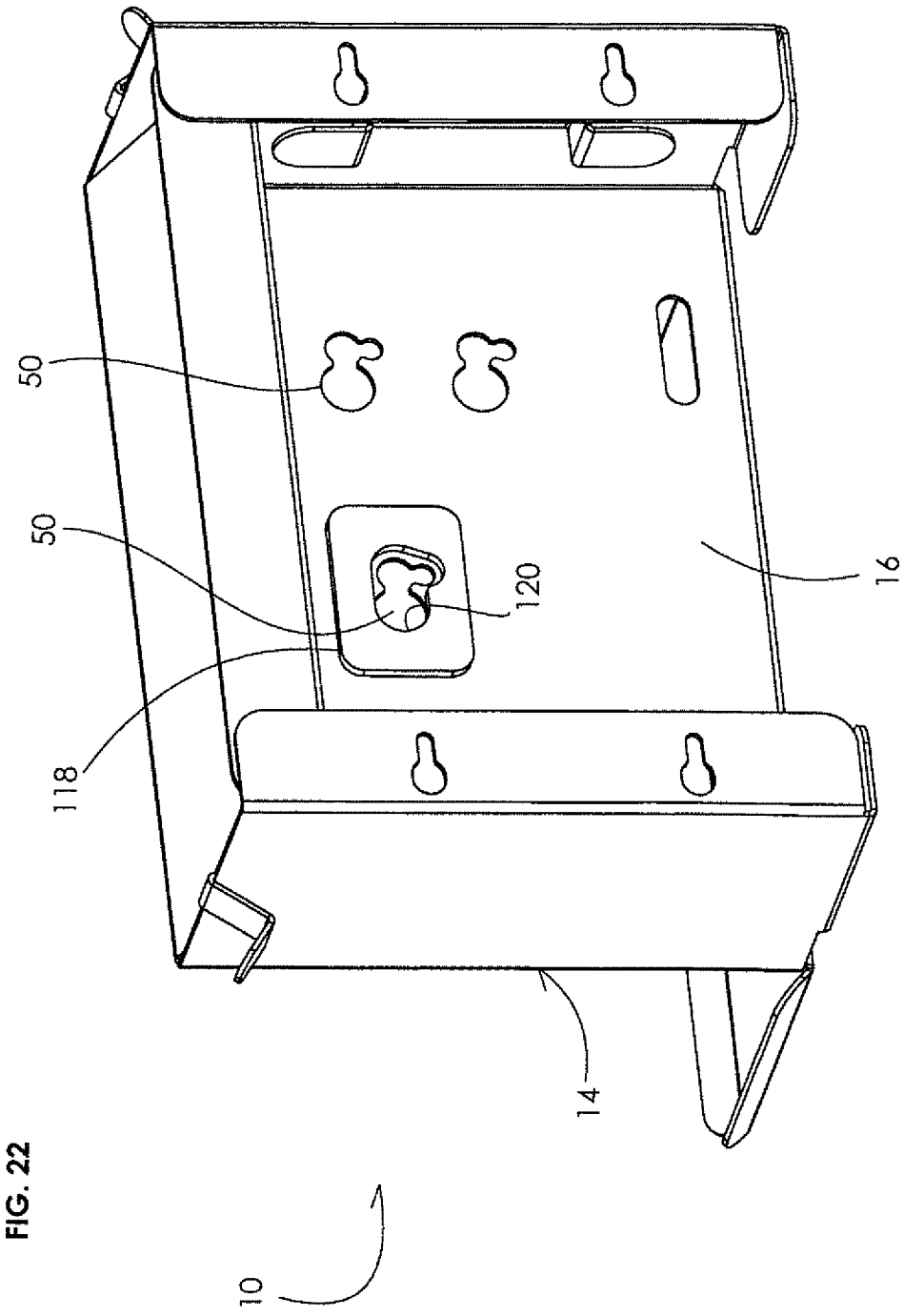
FIG. 22 is a rear perspective view of the charging station of FIG. 21.
Figure 23:
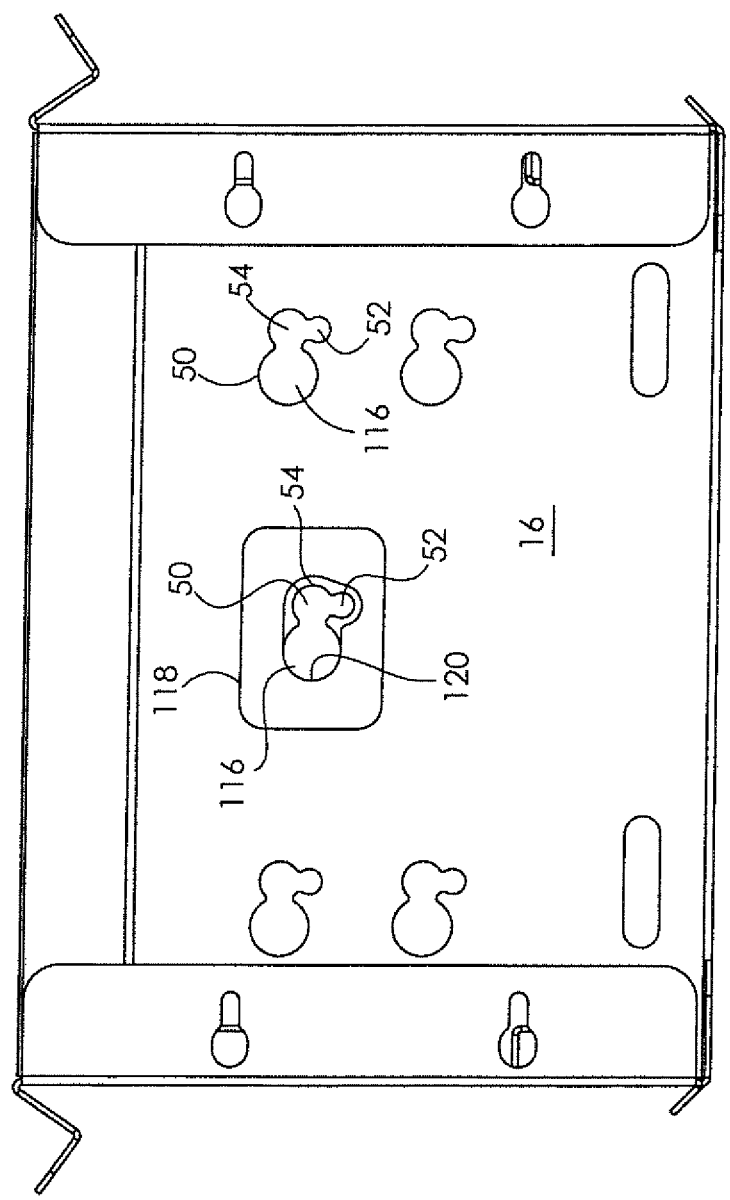
FIG. 23 is a rear elevational view of the charging station of FIGS. 21 and 22.

FIGS. 21 to 23 illustrate a charging station 10 for a portable electronic device 12 according to a sixth embodiment of the present invention. This embodiment further illustrates that the base 14 can take other forms. This embodiment is substantially the same as the first embodiment except that it is sized smaller. This embodiment is sized for holding a tablet computer such as, for example, a iPad available from Apple, Inc., in the landscape position or two side-by-side smart phones such as, for example, an iPhone available from Apple, Inc.

There is a centrally located attachment location 46 having a single opening 50 which is useful for securing a large suction cup 48 for the tablet computer. There are also attachment locations 46 on opposed sides of the central attachment location that each have a pair of vertically spaced-apart openings 50 which are useful for securing small suction cups 48 for the smart phones.

The illustrated central opening 50 is provided with a stop plate 118 on the rear side of the front wall 16. The stop plate 118 provides an abutment along a portion of the opening 50 so that the flange of the suction cup 48 does not engage the rear side of the front wall 16 when it is to be withdrawn from the opening 50. As the suction cup 48 is laterally moved from the second or intermediate portion 54 to the third portion 116 for withdrawal, the flange engages the stop plate 118 and deforms rather than moving behind the front wall 16 along the edge of the third portion 116. With the suction cup flange deflected in this manner, it is easier to withdraw the suction cup 48. The illustrated stop plate 118 encircles the entire opening 50 but only closely follows the side of the third portion 116 opposite the second portion 54 and does not affect the flange when in the other sections 52, 54 of the opening 50. The illustrated stop plate 118 follows about half of the third section 116 of the opening 50. It is noted that the stop plate 118 can have any other suitable form to provide the abutment 120 for deforming a portion of the suction cup flange. The stop plate 118 can be secured to the rear side of the front wall 16 in any suitable manner such as, for example, double sided tape and the like.

Figure 27:
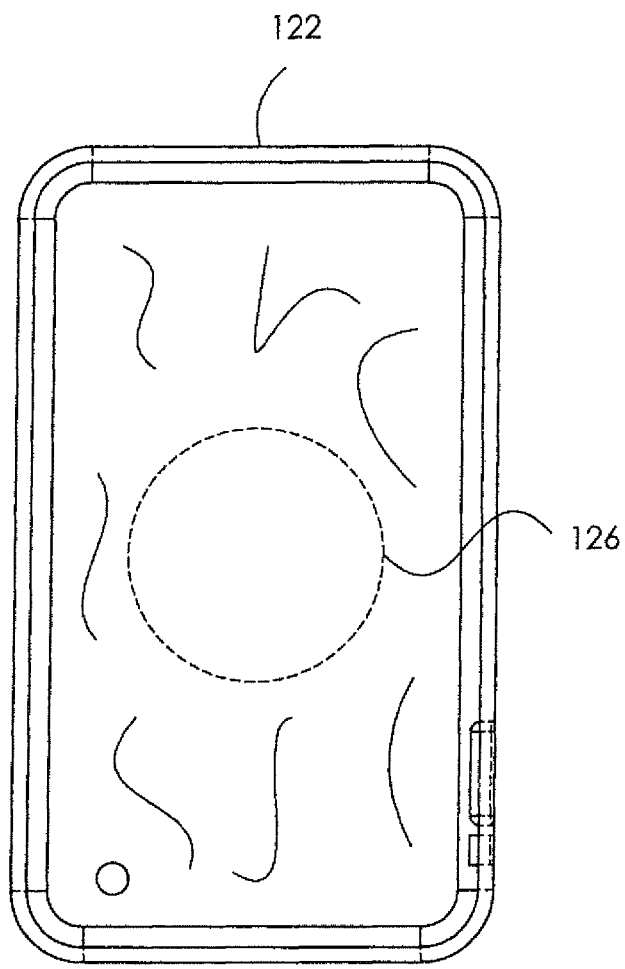
FIG. 27 is a rear elevational view of a sleeve for a portable electronic device which has a plastic puck planar which provides an attachment surface for use with the charging stations of FIGS. 1 to 23.
Figure 28:
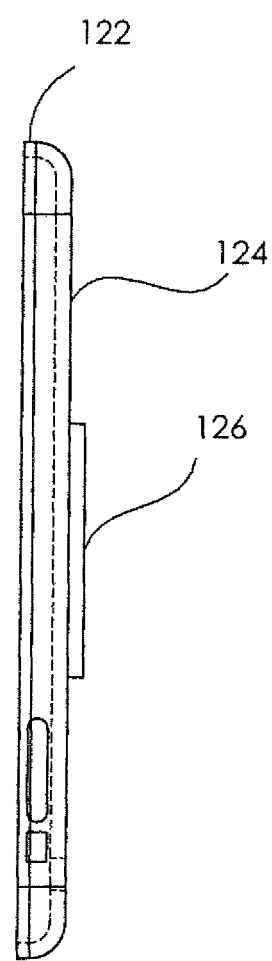
FIG. 28 is a right side elevational view of the sleeve of FIG. 27.

FIGS. 24 to 25 illustrate a sleeve or cover 122 for a portable electronic device 12 in the form of a smart phone such as, for example, an iPhone available from Apple Inc., but the sleeve can be adapted for any other suitable type of portable electronic device 12. The illustrated sleeve 122 easily snaps onto and off of the portable electronic device 12 and provides a hard planar rear surface 124 for attachment of the suction cup 48 thereto. The sleeve 122 is useful when the portable electronic device 122 does not have a rear surface suitable for attachment of the suction cup 48 thereto and/or when the user of the portable electronic device 12 prefers to have a cover or sleeve 122. The illustrated sleeve 122 comprises a relatively hard plastic but any other suitable material can alternatively be utilized. It is noted that the sleeve 122 can alternatively have any other suitable form that provides a suitable attachment surface 124 for the suction cup 48. FIGS. 27 and 28 illustrate a rear surface 124 of a sleeve or cover 122 that is primarily comprised of a material or surface that is unsuitable for attachment of the suction cup 48 but has an attachment puck 126 thereon which forms a suitable hard planar surface for attachment of the suction cup 48. For example, the sleeve 122 can comprise leather with a plastic puck 126 attached thereto or embedded therein. The illustrated puck 126 is circular but the puck 126 can have any other suitable size and/or shape.

The above illustrated removable fasteners 18 comprise the openings 50 and the suction cups 48 but they can be any other suitable removable fastener 18 for temporarily securing the portable electronic devices 12 to the front wall 16 such as for example, hook and loop fasteners, Command Strips available from the 3M Co., and Dual Lock fasteners available from the 3M Co., clips, peg and slot connections, and the like. The suction cups 48, however, are preferred over other removable fasteners that require something to be bonded or otherwise secured to the portable electronic device 12. This can somewhat be avoided by utilizing the sleeve 122 but it is preferred not to be required to utilize the sleeve 22 for all portable electronic devices 12 because some users prefer not to use sleeves or covers 122. FIGS. 28 and 29 illustrate a sleeve 122 having a flanged pin or peg 128 which cooperates with the keyhole openings 50 or the like. It is noted that the peg 128 and the openings 50 can be reversed on the front wall 16 and the sleeve 122 if desired. It is also noted that any other suitable type of removable fastener 18 can alternatively be utilized.

Any of the features or attributes of the above the above described embodiments and variations can be used in combination with any of the other features and attributes of the above described embodiments and variations as desired.

It is apparent from the above detailed description of preferred embodiments of the present invention, that the charging stations 10 improve visibility and usability of the personal electronic devices during charging. Thus, these charging stations 10 will allow easy viewing of streaming videos and the like on the portable electronic devices 12 while not depleting the battery. The charging stations 10 make it convenient for individuals to use and charge their phone on their night stand next to their bed. Thus, their cell phones can be used as an alarm clock and a replacement for their land line. Additionally, the charging stations 10 organize and hold other objects that do not need to be charged such as mail 130, keys 132, wallets and the like to avoid clutter and misplacement of the items. Furthermore, the charging stations 10 provide better wire management and control than products in the prior art. Moreover, some of the disclosed charging stations 10 can be both mounted to a wall and supported on a table top so the user can select which way they desire to use the charging station 10.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A charging station for a portable electronic device, said charging station comprising, in combination:
    a base having a forward facing wall no more than 45 degrees from vertical;
    at least one forward facing suction cup secured to the forward facing front wall so that the suction cup can temporarily secure the portable electronic device to the forward facing wall in a position that the portable electronic device can be viewed and operated while recharging;
    wherein a suction cup opening is formed in the forward facing wall having a first portion sized for preventing passage of a flange of the suction cup therethrough for retaining the suction cup to the forward facing wall and a second portion sized larger than the first portion for passage of the flange therethrough for installation and removal of the suction cup to the forward facing wall; and
    wherein the opening has a third portion sized for passage of a flange of another suction cup therethrough which is larger than the flange of the suction cup, and wherein the second portion is sized for preventing passage of the flange of the another suction cup therethrough for retaining the another suction cup to the forward facing wall.

2. The charging station according to claim 1, wherein there are at least two of the suction cups secured to the forward facing wall and laterally spaced apart.

3. The charging station according to claim 1, wherein there are at least two of the suction cups secured to the forward facing wall and vertically spaced apart.

4. The charging station according to claim 1, wherein the suction cup is removable from the forward facing wall.

5. The charging station according to claim 1, wherein a stop plate is provided adjacent the suction cup opening to prevent a portion of the flange of the suction cup from engaging the wall to ease withdrawal of the flange through the suction cup opening.

6. The charging station according to claim 1, wherein the suction cup is spaced from the forward facing wall by a spacer.

7. The charging station according to claim 1, further comprising a cradle located below the suction cup to limit downward movement of the portable electronic device upon release of the portable electronic device from the fastener.

8. The charging station according to claim 1, wherein the base includes both at least one vertical and rearward facing back wall rearwardly spaced from the forward facing wall and configured to secure the base to a vertically extending support surface and at least one horizontal and downward facing base wall located below the forward facing wall and configured to support the base on a horizontally extending support surface so that the base can selectively rest on a tabletop and be secured to a wall.

9. The charging station according to claim 1, wherein the suction cup is configured to rotate relative to the forward facing wall so that the portable electronic device secured thereto can be rotated between portrait and landscape orientations.

10. The charging station according to claim 1, wherein the base includes at least one cable opening for passage of a cable extending from the portable electronic device to a power source.

11. The charging station according to claim 1, wherein the base includes at least one of (a) at least one vertical and rearward facing back wall rearwardly spaced from the forward facing wall and configured to secure the base to a vertically extending support surface and (b) at least one horizontal and downward facing base wall located below the forward facing wall and configured to support the base on a horizontally extending support surface.

12. A charging station for portable electronic devices, said charging station comprising, in combination:
a base having a forward facing wall no more than 45 degrees from vertical;
a plurality of forward facing suction cups secured to the forward facing wall so that the suction cups can temporarily secure the portable electronic devices to the forward facing wall to limit movement of the personal electronic device in at least one lateral direction and in a position that the portable electronic device can be viewed and operated while recharging;
wherein openings are formed in the forward facing wall for removably securing the suction cups; and
wherein each of the openings has a first portion sized for preventing passage of a first flange of a first one of the suction cups therethrough for retaining the first one of the suction cups to the forward facing wall, a second portion sized larger than the first portion for passage of the first flange of the first one of the suction cups therethrough for installation and removal of the first one of the suction cups to the forward facing wall and sized for preventing passage of a second flange of a second one of the suction cups therethrough for retaining the second one of the suction cups to the forward facing wall, and a third portion sized larger than the second portion for passage of the second flange of the second one of the suction cups therethrough for installation and removal of the second one of the suction cups to the forward facing wall.

13. The charging station according to claim 12, wherein the suction cup is removable from the forward facing wall.

14. The charging station according to claim 12, wherein stop plates are provided adjacent the openings to prevent a portion of the flanges of the suction cups from engaging the wall to ease withdrawal of the flanges through the openings.

15. The charging station according to claim 12, wherein the suction cups are spaced from the forward facing wall by spacers.

16. The charging station according to claim 12, further comprising at least one cradle located below the suction cups to limit downward movement of the portable electronic device upon release of the portable electronic device from the suction cups.

17. The charging station according to claim 12, wherein the base includes both at least one vertical and rearward facing back wall rearwardly spaced from the forward facing wall and configured to secure the base to a vertically extending support surface and at least one horizontal and downward facing base wall located below the forward facing wall and configured to support the base on a horizontally extending support surface so that the base can selectively rest on a tabletop and be secured to a wall.

18. The charging station according to claim 12, wherein the suction cups are configured to rotate relative to the forward facing wall so that the portable electronic device secured thereto can be rotated between portrait and landscape orientations.

19. The charging station according to claim 12, wherein the base includes at least one cable opening for passage of a cable extending from the portable electronic device to a power source.

20. The charging station according to claim 12, wherein the base includes at least one of (a) at least one vertical and rearward facing back wall rearwardly spaced from the forward facing wall and configured to secure the base to a vertically extending support surface and (b) at least one horizontal and downward facing base wall located below the forward facing wall and configured to support the base on a horizontally extending support surface.

* * * * *